United States Patent
Beck et al.

(10) Patent No.: US 11,434,970 B2
(45) Date of Patent: Sep. 6, 2022

(54) DAMPING VALVE FOR A VIBRATION DAMPER

(71) Applicant: ZF FRIEDRICHSHAFEN AG, Friedrichshafen (DE)

(72) Inventors: Holger Beck, Eitorf (DE); Klaus Schmitz, Eitorf (DE); Sven Kapell, Eitorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 412 days.

(21) Appl. No.: 16/628,978

(22) PCT Filed: Jun. 21, 2018

(86) PCT No.: PCT/EP2018/066501
§ 371 (c)(1),
(2) Date: Jan. 6, 2020

(87) PCT Pub. No.: WO2019/007689
PCT Pub. Date: Jan. 10, 2019

(65) Prior Publication Data
US 2020/0132153 A1    Apr. 30, 2020

(30) Foreign Application Priority Data
Jul. 7, 2017   (DE) ............... 10 2017 211 614.5

(51) Int. Cl.
*F16F 9/348* (2006.01)
*F16K 15/04* (2006.01)
(Continued)

(52) U.S. Cl.
CPC ......... *F16F 9/3485* (2013.01); *F16F 9/3481* (2013.01); *F16K 15/04* (2013.01);
(Continued)

(58) Field of Classification Search
CPC ...... F16F 9/3485; F16F 9/3481; F16F 9/3488; F16F 2230/0041; F16K 15/04;
(Continued)

(56) References Cited

U.S. PATENT DOCUMENTS 2,695,034 A    11/1954   Brundrett et al.
3,561,471 A *  2/1971    Sands ............... F16K 17/26
                                              137/460
(Continued)

FOREIGN PATENT DOCUMENTS

DE         1044537        11/1958
DE      102005045267      12/2006
(Continued)

OTHER PUBLICATIONS

Office Action for the corresponding German Patent Application No. 10 2017 211 614.5.

*Primary Examiner* — Daphne M Barry
*Assistant Examiner* — Frederick D Soski
(74) *Attorney, Agent, or Firm* — Cozen O'Connor

(57) ABSTRACT

A damping valve having a damping valve body with at least one flow channel for damping medium. A valve rod is arranged in the flow channel. The valve rod cooperates with a valve disk and a valve seat surface. The valve rod carries a further valve disk that cooperates with a second valve seat surface. The first valve disk together with the first valve seat surface forms a first partial valve having a first permanently open pilot orifice cross section, and the second valve disk together with the second valve seat surface forms a second partial valve having a second pilot orifice cross section, and a shuttle valve is formed which opens one partial valve and closes the other partial valve depending on the flow direction.

9 Claims, 6 Drawing Sheets

(51) Int. Cl.
*F16K 15/06* (2006.01)
*F16K 47/00* (2006.01)

(52) U.S. Cl.
CPC .......... *F16K 15/063* (2013.01); *F16F 9/3488* (2013.01); *F16F 2230/0041* (2013.01); *F16K 47/012* (2021.08); *F16K 47/0111* (2021.08); *Y10T 137/7837* (2015.04); *Y10T 137/7866* (2015.04)

(58) Field of Classification Search
CPC .. F16K 15/063; F16K 47/012; F16K 47/0111; Y10T 137/7866; Y10T 137/7837
See application file for complete search history.

(56) References Cited

U.S. PATENT DOCUMENTS

| | | | | |
|---|---|---|---|---|
| 3,683,957 A * | 8/1972 | Sands | F16K 17/26 | 137/460 |
| 3,861,415 A * | 1/1975 | Larsen | F16K 15/04 | 137/513.5 |
| 3,925,987 A * | 12/1975 | Faisandier | F16H 39/02 | 137/112 |
| 3,972,396 A * | 8/1976 | Bochnak | B64C 27/51 | 188/312 |
| 4,030,520 A * | 6/1977 | Sands | F16K 17/30 | 137/513.5 |
| 4,216,570 A | 8/1980 | Farris et al. | | |
| 4,243,067 A * | 1/1981 | Rubey | F16K 15/04 | 137/533.15 |
| 4,446,890 A * | 5/1984 | Simpson, Jr. | F16K 17/10 | 137/87.01 |
| 4,650,043 A | 3/1987 | Eckersley | | |
| 4,768,629 A * | 9/1988 | Wossner | F16F 9/49 | 188/322.22 |
| 4,811,756 A * | 3/1989 | Hall | F16K 17/26 | 137/513.5 |
| 4,823,922 A | 4/1989 | Ergun | | |
| 4,944,327 A * | 7/1990 | Gyben | F16K 15/04 | 239/572 |
| 4,974,628 A * | 12/1990 | Tepermeister | F16K 15/042 | 137/533.15 |
| 4,981,154 A * | 1/1991 | Bailey | F16K 15/04 | 137/202 |
| 5,150,775 A * | 9/1992 | Charles | F16F 9/34 | 188/315 |
| 5,375,418 A * | 12/1994 | Shelhart | B60J 7/1273 | 60/474 |
| 5,406,978 A * | 4/1995 | Smolong | F15C 3/06 | 137/513.5 |
| 5,529,091 A * | 6/1996 | Anderson | F16K 15/04 | 137/516.25 |
| 5,529,154 A * | 6/1996 | Tanaka | F16F 9/3484 | 188/280 |
| 8,240,329 B1 * | 8/2012 | Shore | F16F 9/46 | 251/117 |
| 8,256,738 B2 | 9/2012 | Johnson | | |
| 10,677,364 B2 * | 6/2020 | Wang | F16K 11/044 | |
| 10,883,560 B2 * | 1/2021 | Schneider | F16F 9/34 | |
| 11,125,304 B2 * | 9/2021 | Watanabe | F16H 7/0848 | |
| 2005/0028864 A1 * | 2/2005 | Thrash, Jr. | F16K 11/07 | 137/112 |
| 2005/0045440 A1 * | 3/2005 | Kock | F16F 9/512 | 188/322.15 |
| 2005/0115786 A1 * | 6/2005 | Forster | F16F 9/3485 | 188/322.15 |
| 2006/0013717 A1 * | 1/2006 | Beck | F16F 9/064 | 417/559 |
| 2006/0042698 A1 * | 3/2006 | Koeneman | F16K 15/04 | 137/533.11 |
| 2006/0283676 A1 * | 12/2006 | Deferme | F16F 9/3485 | 188/322.15 |
| 2007/0080034 A1 * | 4/2007 | Hammer | F16F 9/512 | 188/282.1 |
| 2007/0261931 A1 * | 11/2007 | Beck | B60G 17/044 | 188/315 |
| 2008/0029939 A1 * | 2/2008 | Beck | B60G 17/044 | 267/64.17 |
| 2008/0265476 A1 * | 10/2008 | Beck | F16F 9/50 | 267/64.17 |
| 2009/0000469 A1 * | 1/2009 | Schmitz | F16F 9/56 | 92/99 |
| 2009/0066041 A1 * | 3/2009 | Kirchner | F16F 9/43 | 280/5.514 |
| 2010/0011578 A1 * | 1/2010 | Beck | F16K 15/046 | 29/890.122 |
| 2010/0126812 A1 * | 5/2010 | Rottenberger | F16F 9/3235 | 188/266.6 |
| 2010/0147403 A1 * | 6/2010 | Bresnahan | F15B 13/028 | 137/528 |
| 2010/0206404 A1 * | 8/2010 | Morrison | F16K 11/056 | 137/533.15 |
| 2011/0186393 A1 * | 8/2011 | Maeda | F16F 9/3488 | 188/280 |
| 2011/0209956 A1 * | 9/2011 | Maeda | F16F 9/369 | 188/322.13 |
| 2012/0048401 A1 * | 3/2012 | Yamashita | F16K 15/04 | 137/528 |
| 2013/0072751 A1 * | 3/2013 | Fogarty | A61F 2/26 | 137/511 |
| 2013/0147205 A1 * | 6/2013 | Tucker | B60G 11/265 | 290/1 A |
| 2013/0269816 A1 * | 10/2013 | Lee | F16L 55/053 | 138/31 |
| 2013/0341142 A1 * | 12/2013 | Forster | F16F 9/464 | 188/322.15 |
| 2014/0007954 A1 * | 1/2014 | Veit | E21B 43/16 | 137/528 |
| 2014/0353099 A1 * | 12/2014 | Yamashita | F16F 9/465 | 188/314 |
| 2015/0053518 A1 * | 2/2015 | Nowaczyk | F16F 9/5126 | 188/313 |
| 2015/0211655 A1 | 7/2015 | Bereznai | | |
| 2015/0276005 A1 * | 10/2015 | Kim | F16F 9/348 | 188/317 |
| 2015/0362083 A1 * | 12/2015 | Patterson | F16K 11/0712 | 137/12 |
| 2016/0290447 A1 * | 10/2016 | Kunimatsu | F16H 7/0848 | |
| 2018/0135720 A1 * | 5/2018 | De Kock | F16F 9/3235 | |
| 2018/0156301 A1 * | 6/2018 | De Kock | F16F 9/3488 | |
| 2018/0187737 A1 * | 7/2018 | Förster | F16F 9/3488 | |
| 2018/0259029 A1 * | 9/2018 | Yamashita | F16F 9/3488 | |
| 2018/0306265 A1 * | 10/2018 | De Kock | F16F 9/368 | |
| 2019/0003550 A1 * | 1/2019 | Yan | F16F 9/348 | |
| 2019/0168044 A1 * | 6/2019 | Zlatintsis | F16K 15/04 | |
| 2019/0323314 A1 * | 10/2019 | Hughes | E21B 33/12 | |
| 2019/0346054 A1 * | 11/2019 | Miko | F16K 27/0209 | |
| 2019/0368622 A1 * | 12/2019 | Kang | F16K 15/026 | |
| 2020/0355239 A1 * | 11/2020 | Wrzesinski, II | F16F 9/3278 | |
| 2020/0362667 A1 * | 11/2020 | Zachariah | E21B 1/00 | |

FOREIGN PATENT DOCUMENTS

| | | |
|---|---|---|
| DE | 102015212535 | 1/2017 |
| FR | 2301737 | 9/1976 |
| GB | 570813 | 7/1945 |

* cited by examiner

DAMPING VALVE FOR A VIBRATION DAMPER

CROSS REFERENCE TO RELATED APPLICATIONS

This is a U.S. national stage of Application No. PCT/EP2018/066501 filed Jun. 21, 2018. Priority is claimed on German Application No. DE 10 2017 211 614.5 filed Jul. 7, 2017 the content of which is incorporated herein by reference.

BACKGROUND OF THE INVENTION

1. Field of the Invention

The invention is directed to a damping valve for a vibration damper.

2. Description of Related Art

A damping valve for a vibration damper in which a damping valve body has a flow channel in which a pull rod is arranged is known from DE 10 2015 212 535 A1. The pull rod carries a valve disk which is preloaded against a valve seat surface of the damping valve body. At least one flow channel is used with the valve disk for each flow direction. Additionally, a flow-in channel for a first flow direction can be outfitted with a check valve that holds open a minimum passage cross section, also known as pilot orifice cross section. In some uses of the vibration damper, there must be provided for a respective throughflow direction a pilot orifice cross section which differs from the pilot orifice cross section of the other throughflow direction. Consequently, two flow channels are arranged in the damping valve body for two check valves. However, the check valves used for this purpose, which are also known in professional circles as Lee valves, are comparatively expensive.

SUMMARY OF THE INVENTION

It is the object of one aspect of the present invention to provide a pilot orifice cross section for the damping valve which is dependent upon the throughflow direction of the damping medium.

One aspect of the invention is that a valve rod carries a further valve disk that cooperates with a second valve seat surface, the first valve disk together with the first valve seat surface forms a first partial valve having a first permanently open pilot orifice cross section, and the second valve disk together with the second valve seat surface forms a second partial valve having a second pilot orifice cross section, and a shuttle valve is formed that opens one partial valve and closes the other partial valve depending on the flow direction.

An advantage consists in that the utilized component parts are very simple on the one hand and, on the other hand, can be easily assembled and adapted to any characteristic. Because of the shuttle valve principle, only one flow channel is needed for two operative flow cross sections. Consequently, compared to the known prior art, the installation space for a flow channel can be economized.

With respect to a simple assembly, the valve rod is constructed to be axially divisible so that valve rods with one-part valve rod head can be used.

According to an advantageous subclaim, the valve rods are connected to one another by a connection sleeve. This also serves to simplify the valve component parts.

The connection sleeve is fixed inside of the flow channel for a simple screw assembly. The fixing is by no means permanent; rather, it is only for the assembly process.

In a preferred construction, the valve rods are connected to one another via a thread connection. Consequently, the connection sleeve should maintain its position in the housing until the thread connections in the connection sleeve have engaged. After this, the fixing would be entirely superfluous.

Alternatively, the valve rods can be connected to one another via an interference fit. There would then be no incentive to contemplate threaded securing means.

Optionally, the valve rod is positioned in an initial position relative to the two valve seat surfaces by a spring arrangement. Accordingly, a preferred operating position can be adjusted.

In an alternative solution, the damping valve comprises a damping valve body with at least one flow channel for damping medium, and a valve disk restricts the damping medium flow for a throughflow direction. The valve disk is a component part of a check valve arrangement with a check valve, and the check valve arrangement has at least one further valve disk for a second throughflow direction. At least one of the valve disks determines a pilot orifice cross section, and the check valve hydraulically parallelly switches the two flow paths at the valve disks.

This solution also utilizes the principle of a shuttle valve for which only one individual flow channel is needed.

In a further embodiment, the check valve arrangement has a divisible housing in which a check valve body alternately controls two flow paths to the two valve disks. The requirements for the check valve are comparatively low and, because of the divided housing, e.g., simple component parts that can be produced by sintering techniques can be used.

With respect to a simple assembly of the check valve arrangement in the flow channel, the housing has a guide shoulder for at least one valve disk.

According to an advantageous subclaim, the flow channel has a radial shoulder as a valve seat surface for a valve disk. The valve seat surface also serves as an axial supporting surface for the check valve arrangement inside of the flow channel.

The housing is preferably centered in the flow channel via the valve disks. Accordingly, a flow cross section is available radially outside of the housing.

Optionally, a supporting disk can be associated with at least one valve disk. The supporting disk stabilizes the valve disk so that very small pilot orifice cross sections can be realized in the valve disk.

Optionally, the supporting disk can be centered at the housing. For this, the housing can have a cone portion that forms a sealing edge between the supporting disk and the housing to minimize undefined leakage.

As a further step for optimal axial fixing of the check valve arrangement, the supporting disk has a larger outer diameter than the inner diameter of the valve seat surface. For the axial fixing, the valve disk takes over practically no force component, so that the valve disk can be dimensioned very thin.

In order to make use of a large incident flow cross section and flow-out cross section on the whole, the check valve arrangement is fixed in the flow channel by means of a screw ring.

BRIEF DESCRIPTION OF THE DRAWINGS

The invention will be described in more detail referring to the following description of the figures.

The drawings show.

DETAILED DESCRIPTION OF THE PRESENTLY PREFERRED EMBODIMENTS

Figure 1:
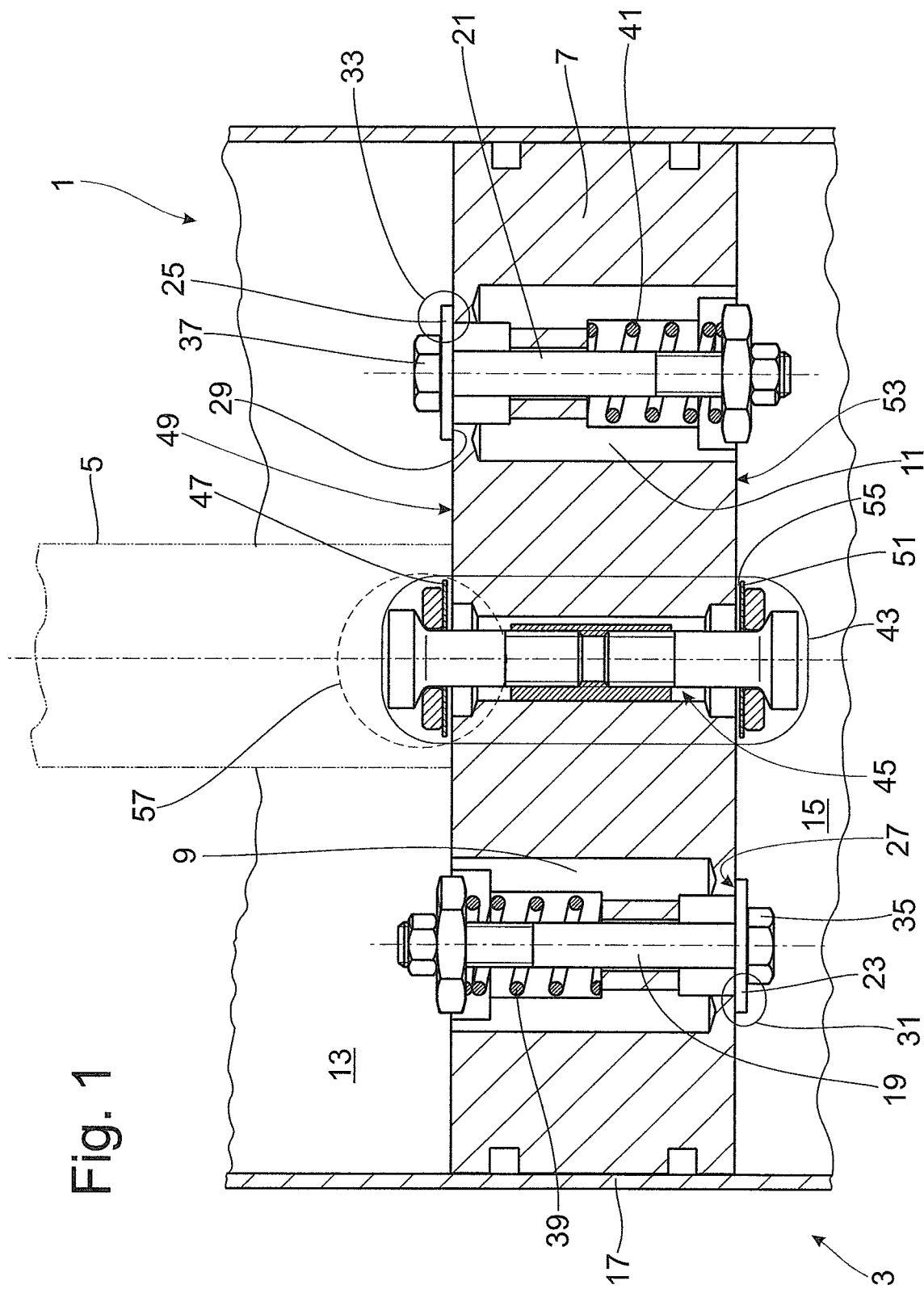
FIG. 1 is a sectional view through the damping valve.
Figure 2:
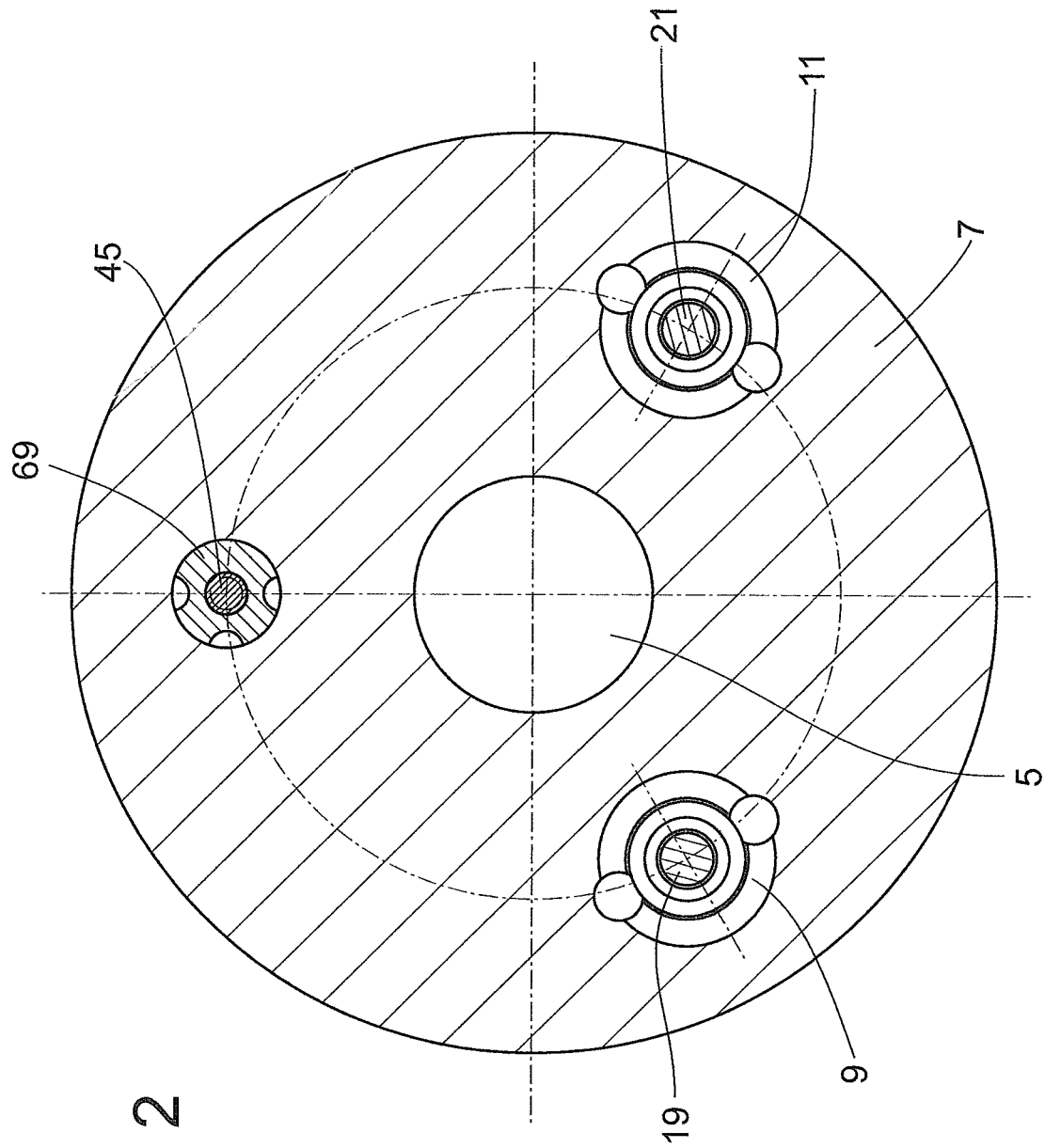
FIG. 2 is a top view with vertical section through individual valves.

FIG. 1 shows a damping valve 1 inside of a vibration damper 3 in the form of a piston valve at a piston rod 5, which is only shown in dashed lines, since the depicted sectional plane extends radially outside of the piston rod 5. The damping valve 1 comprises a damping valve body 7, hereinafter piston, with at least one flow channel 9; 11 for a damping medium in a work space 13 on the piston rod side and a work space 15 remote of the piston rod, which work spaces 13; 15 are inside of a cylinder 17. Together with the piston rod 5, the piston 7 can displace axially inside of the cylinder 17. In this embodiment example, a flow channel 9; 11 is formed in each instance for both flow directions between the two work spaces 13; 15 as can be seen in conjunction with FIG. 2. It will be obvious that a plurality of flow channels 9; 11 could also be provided in principle for each flow direction.

A valve rod 19; 21 that cooperates with a valve disk 23; 25 and a valve seat surface 27; 29 is arranged in each flow channel 9; 11 and accordingly forms a main damping valve 31; 33 inside of the damping valve 1 for a throughflow direction.

During an incident flow of the damping medium proceeding from a work space 13; 15, the damping medium flows via the open end of the flow channel 9; 11 in direction of the valve disk 23; 25. The pressure acting inside of the flow channel 9; 11 exerts a lifting force on the valve disk 23; 25 which is transmitted to the valve rod 19; 21 via a head 35; 37. The valve disk 23; 25 can lift from valve seat surface 27; 29. The valve rod 19; 21 executes a displacing movement. A closing spring 39; 41 exerts a pulling force on the valve rod 19; 21, which works against the lifting force of the operating pressure in the flow channel 9; 11.

In addition to the two main damping valves 31; 33, both of which are identically constructed but may diverge in particulars, e.g., the spring parameters, damping valve 1 has a pilot orifice valve 43. The pilot orifice valve 43 likewise comprises a valve rod 45 that carries at a first end a first valve disk 47 for a first valve seat surface 49 and carries at the other end a further valve disk 51 that cooperates with a second valve seat surface 53. Valve seat surfaces 27 and 53 or 29; 49 may be, but need not be, identical. The distance between the first valve disk 47 and the further valve disk 51 is greater than the distance between the first valve seat surface 49 and the second valve seat surface 53. Consequently, the valve rod with the two valve disks can displace axially relative to the damping valve body within limits because an initial gap 55 is present.

Figure 3:
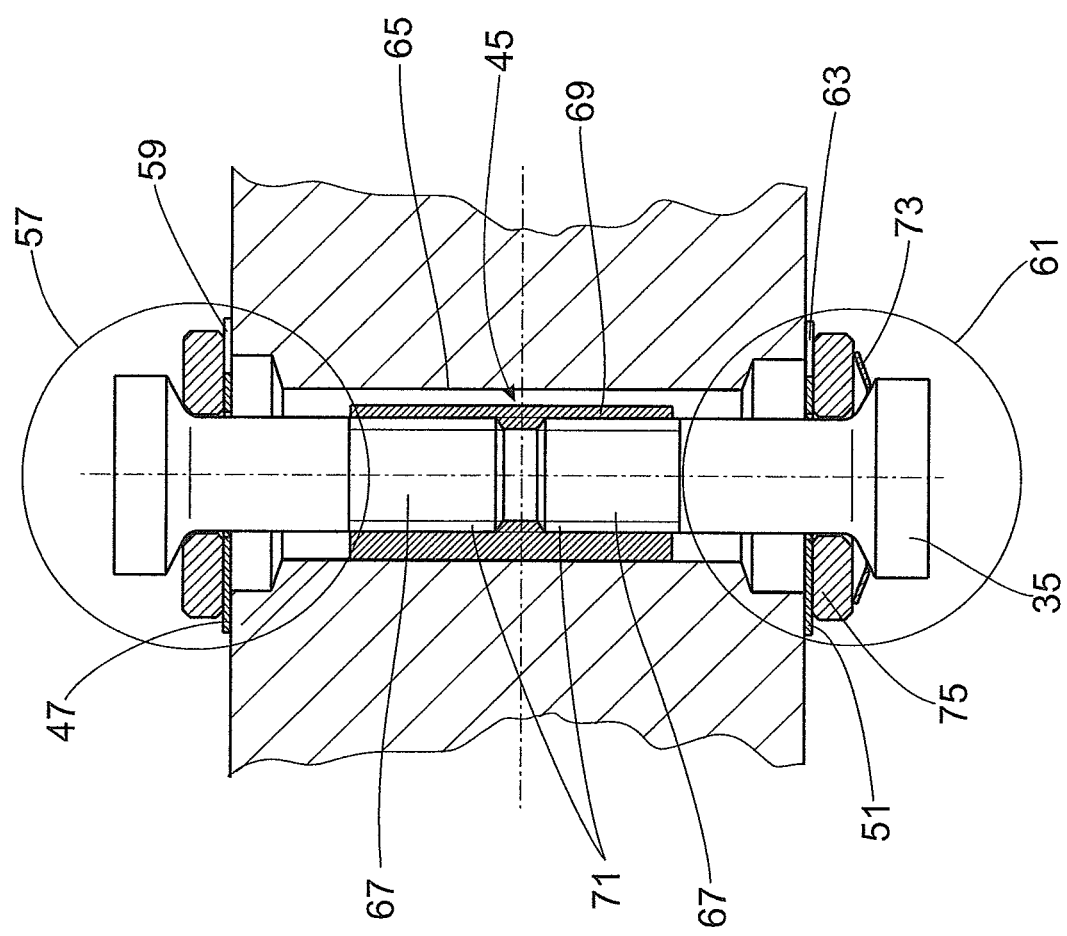
FIG. 3 is a detailed view referring to FIG. 1.

With the first valve seat surface 49, the first valve disk 47 forms a first partial valve 57 having a first permanently open pilot orifice cross section 59 and, with the second valve seat surface 53, the second valve disk 51 forms a second partial valve 61 having a second pilot orifice cross section 63 (see FIG. 3). With the displacing movement of the valve rod 45, the two partial valves 57; 61 form a shuttle valve that opens a partial valve 57; 61 and closes the other partial valve 57; 61 depending on the throughflow direction of at least a third flow channel 65. The two pilot orifice cross sections 59; 63 vary in size and can be produced through a cutout in the valve disk 47; 51 or through a cutout in the valve seat surface 49; 53. The amount of distance between the valve disks 47; 51 is such that damping medium can flow out of one of the work spaces 13; 15 through the pilot orifice cross section of the respective contacting valve disk 47; 53 into the adjoining work space. The choke resistance is determined by the valve disk sitting on the valve seat surface. Consequently, there are two direction-dependent pilot orifice cross sections 59; 63 which do not influence one another. The pressure ratios at the valve disks 47; 51 bring about the displacing forces needed for the valve rod 45. In the direction of flow into the flow channel 65, a pressure force provides for a closing movement of the valve disk and, accordingly, for the pilot orifice cross section becoming operative. A pressure force likewise acts on the other valve disk at the outlet side of the damping medium in direction of the other work space which, however, forms an additional pulling force for the valve rod.

Valve rod 45 is constructed to be axially divisible. For this purpose, two individual valve rods 67 are connected to one another by a connection sleeve 69. For the assembly process, the connection sleeve 69 is fixed inside of the flow channel, e.g., by an adhesive point or by anti-rotation elements of the connection sleeve 69 inside of the flow channel 65. Anti-rotation elements are useful particularly when the individual valve rods 67 are connected to one another via a thread connection 71.

In principle, the two main damping valves 31; 33 first open when the pressure at the pilot orifice cross sections 59; 63 has reached a defined level and the volume flow of the displaced damping medium is too large for the pilot orifice cross sections 59; 63.

In the construction according to FIG. 3, valve rod 45 is positioned in an initial position relative to the two valve seat surfaces 49; 53 by a spring arrangement 73. To this end, e.g., a disk spring 73 is inserted between the head 35; 37 of valve rod 45 and one of the valve disks 47; 51. In the present example, a supporting disk 75 is used. The disk spring 73 preloads the valve rod 45 in an initial position. However, the axial movability of the valve rod 45 continues to be provided. What is more, only a defined initial position is predetermined by the spring arrangement.

Figure 4:
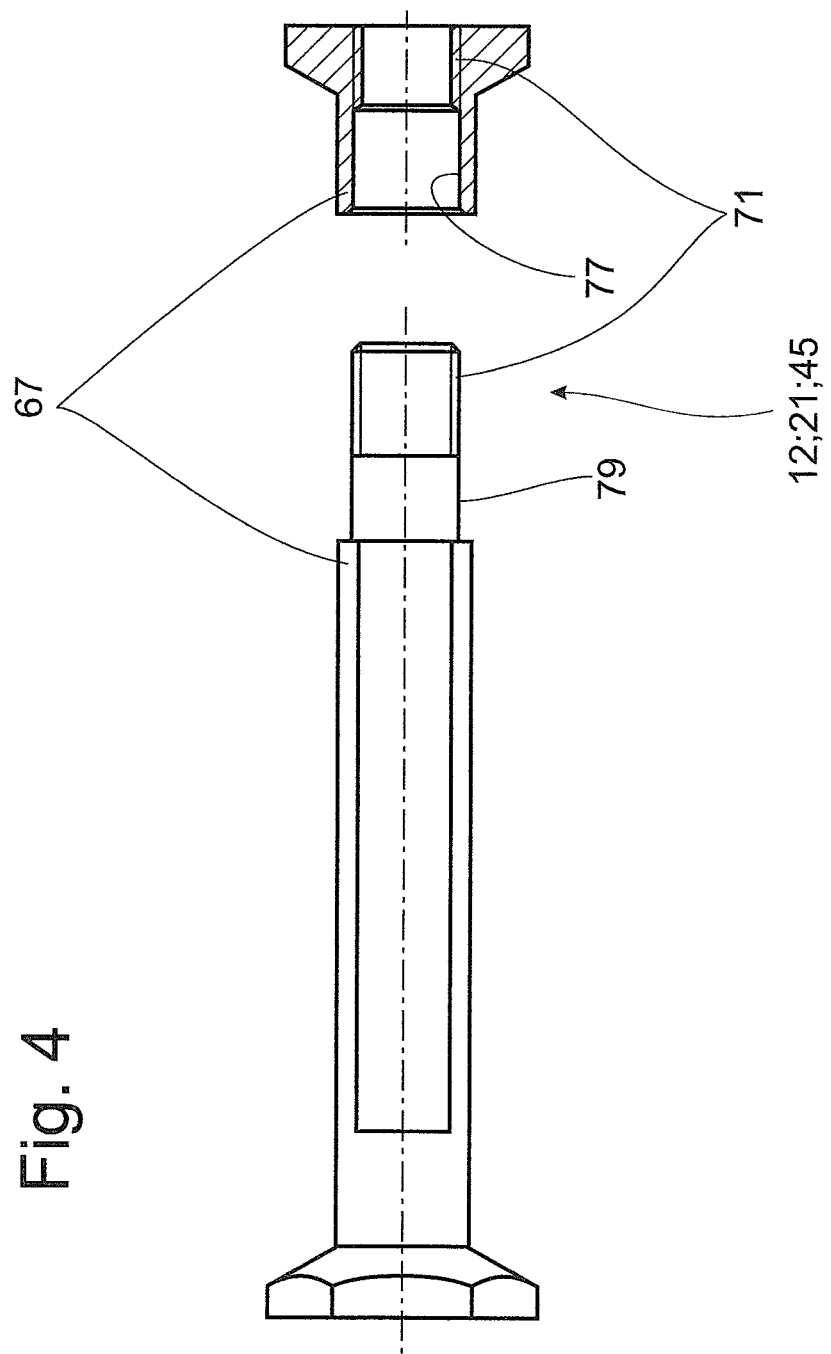
FIG. 4 is a multi-part valve rod as individual part.

FIG. 4 clarifies by way of example how the valve rods 19; 21; 45 can be connected to one another by an interference fit. To this end, the one individual valve rod 67 has a receiving opening 77 and the other valve rod has a bolt portion 79. The bolt portion 79 and the receiving openings 77 form the interference fit. In this concrete example, a thread connection 71 is utilized in addition between the two individual valve rods 71 in order to close the interference fit. On the other hand, the interference fit in cooperation with the thread connection provides for a securing function to prevent an unwanted loosening of the thread connection 71.

Figure 5:
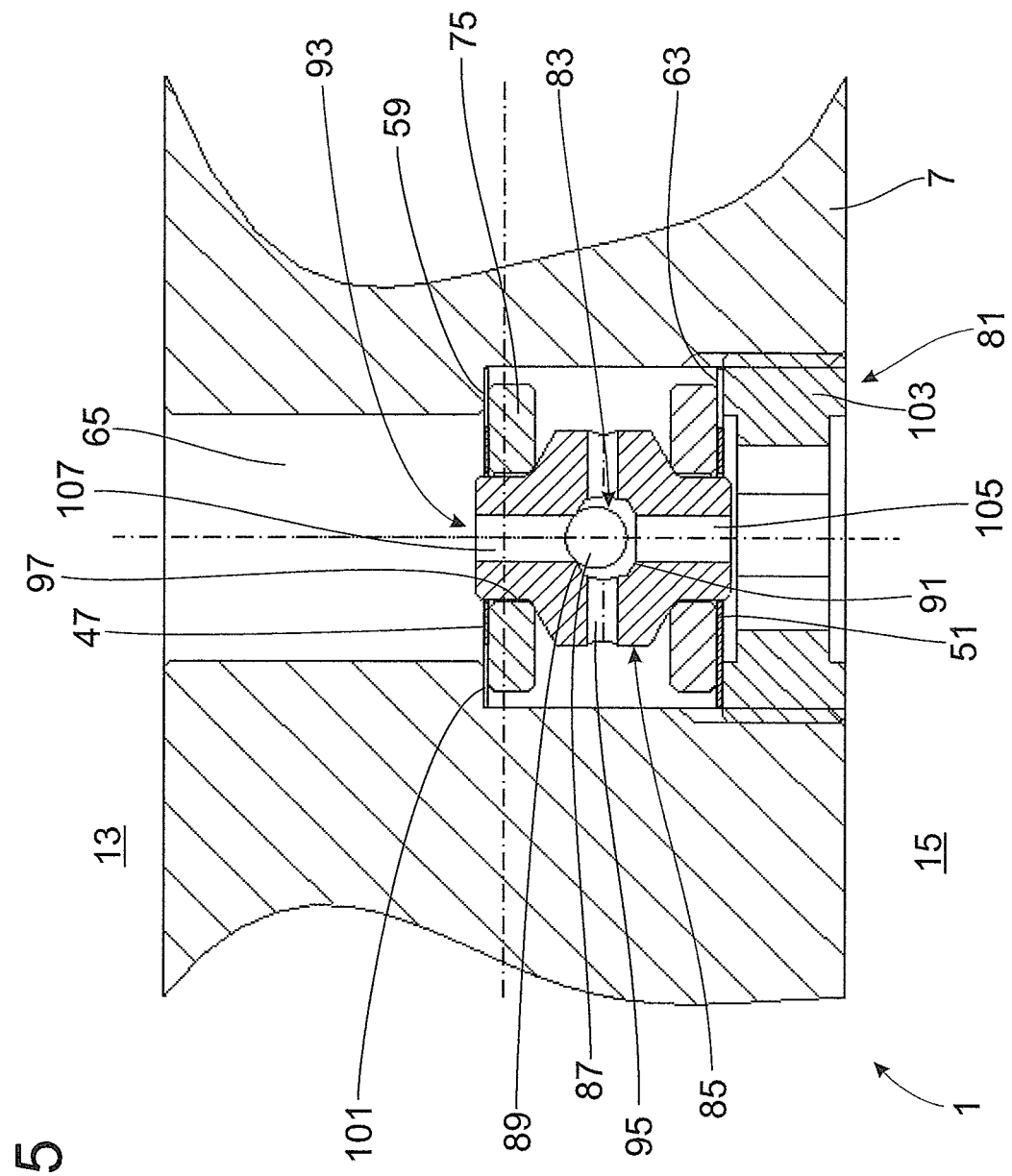
FIG. 5 is a damping valve with a shuttle valve.

FIG. 5 likewise shows a section of the damping valve 1 with a shuttle valve for controlling two pilot orifice cross sections 59; 63. The basic principle of the damping valve 1 corresponds to the constructions according to FIGS. 1 and 2. In contrast, valve disks 47; 51 form a component part of a check valve arrangement 81 with a check valve 83 that hydraulically parallelly switches two flow paths at valve disks 47; 51 in connection with flow channel 65.

The check valve arrangement 81 has a divisible housing 85 in which a check valve body 87 alternately controls two flow paths to the two valve disks 47; 51. The check valve body 87 is constructed, for example, as a ball that is movable between two conical valve seat surfaces 89; 91. In this case also, the distance between valve seat surfaces 89; 91 is greater than the diameter of the check valve body 87.

Two intersecting connection channels 93; 95 are formed in the housing 85. Valve seat surfaces 89; 91 lie in the intersection point of the connection channels 93; 95. One connection channel 93 runs in axial direction of flow channel 65. Housing 85 is constructed of two shells, and a partition joint extends through one of the connection channels 93; 95. Accordingly, the housing 85 can be produced in a very simple manner by creative forming. When the partition joint is inside of a connection channel 93; 95 and the configuration is symmetrical, housing 85 can comprise two identical component halves.

Housing 85 has a guide shoulder 97; 99 for at least one valve disk 47; 51. Because of the symmetrical configuration of the housing, there are two guide shoulders 97; 99 for the two valve disks 47; 51. The flow channel 65 in the damping valve body 7 has a radial shoulder 101 as a valve seat surface for a valve disk 47. The valve seat surface serves as a supporting surface of the housing 85 inside of the flow channel 65. The valve disks 47; 51 have an outer diameter which is only slightly smaller than the diameter of the flow channel 65 so that housing 85 is centered in flow channel 65 via valve disks 47; 51.

A supporting disk 75 is associated with at least one valve disk 47; 51 such that the tensioning force for axially fixing the housing 85 is not dependent upon the elasticity of the valve disk 47; 51, and supporting disk 75 is centered radially inwardly at housing 85. Therefore, supporting disk 75 has a larger outer diameter than the inner diameter of the valve seat surface and of shoulder 101. A screw ring 103 in flow channel 65 serves to axially fix the check valve arrangement 81.

When there is incident flow from the direction of work space 15, the check valve body 87 is moved into and held in the depicted position on the valve seat surface 89. The damping medium can flow in via a first channel portion 105 up to the valve seat surface 89 of the check valve 83 and is then distributed radially via the connection channel 95 into flow channel 65. However, the damping medium can also flow into flow channel 65 parallelly through the pilot orifice cross section 63 between valve disk 51 and screw ring 103. However, the cross section of the first channel portion 105 is many times larger than the pilot orifice cross section 63. Further flow through a second channel portion 107 beyond the check valve body 87 is prevented by the blocking position of check valve body 87. Accordingly, the entirety of the damping medium flows past the outside of the housing 85 in direction of pilot orifice cross section 59, which is dimensioned appreciably larger than pilot orifice cross section 63. This difference in size is shown graphically by the cutouts on both sides in the valve disk 47. Consequently, the effective pilot orifice cross section is determined by pilot orifice cross section 59.

Figure 6:
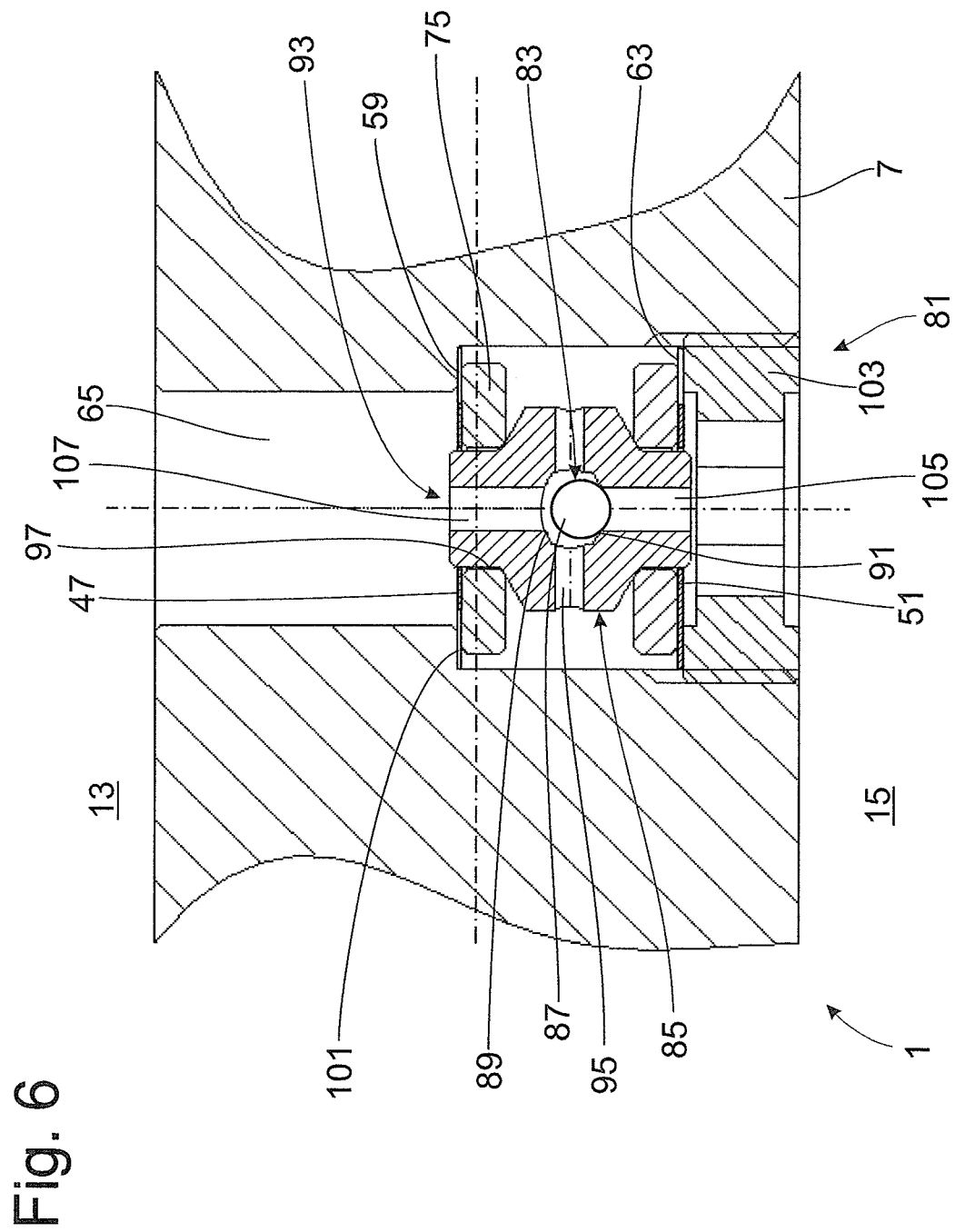
FIG. 6 is a further switching position referring to FIG. 5.

In the opposite flow direction according to FIG. 6, the check valve body 87 blocks the first channel portion 105. The damping medium arrives again in the valve seat area via the second channel portion 107 and continues to flow radially outwardly through the connection channels 93; 95 until flow channel 65. Proceeding along the flow path, the damping medium passes the pilot orifice cross section 63 which represents the operative pilot orifice cross section based on the smaller cross section compared to the second channel portion 107.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve comprising:
a damping valve body with a flow channel having a first and second throughflow direction;
a first valve disk configured such that the first valve disk restricts a damping medium flow;
a check valve arrangement with a check valve; and
a second valve disk configured such that the second valve disk restricts the damping medium flow,
wherein the valve disks each have an annular flow path that restricts the dampening medium flow, and
wherein the check valve switches between the two throughflow directions of the flow channel.

2. The damping valve according to claim 1, wherein the check valve arrangement has a divisible housing having a check valve body.

3. The damping valve according to claim 2, wherein the divisible housing has a guide shoulder for at least one valve disk.

4. The damping valve according to claim 2, wherein the divisible housing is centered in the flow channel via the valve disks.

5. The damping valve according to claim 1, wherein a supporting disk is associated with at least one of the valve disks.

6. The damping valve according to claim 5, wherein the supporting disk is centered at a divisible housing.

7. The damping valve according to claim 5, wherein the supporting disk has a larger outer diameter than an inner diameter of a valve seat surface.

8. The damping valve according to claim 1, wherein the flow channel has a radial shoulder configured as a valve seat surface for the first valve disk.

9. The damping valve according to claim 1, wherein the check valve arrangement is fixed in the at least one flow channel by a screw ring.

* * * * *